United States Patent [19]
Naor

[11] Patent Number: 5,386,785
[45] Date of Patent: Feb. 7, 1995

[54] COMBINED SUPPORT AND ARTICLE-SUPPORT PANEL FOR USE IN CONJUNCTION WITH A VEHICLE STEERING WHEEL

[76] Inventor: Peter Naor, 17581 Caminito Canasto, San Diego, Calif. 92127

[21] Appl. No.: 918,281

[22] Filed: Jul. 22, 1992

[51] Int. Cl.⁶ .............................................. A47B 23/00
[52] U.S. Cl. ...................................................... 108/44
[58] Field of Search .................................... 108/44, 45

[56] References Cited

U.S. PATENT DOCUMENTS

| 2,211,902 | 8/1940 | Morris | 311/21 |
| 2,299,025 | 10/1942 | McGinley | 311/22 |
| 2,749,655 | 6/1956 | Ashton | 45/58 |
| 2,866,381 | 12/1958 | Alldredge | 108/44 |
| 3,074,745 | 1/1963 | Burckhalter | 281/44 |
| 3,643,606 | 2/1972 | Vise | 108/44 |
| 3,817,190 | 6/1974 | Evangelista | 108/44 |
| 3,952,988 | 4/1976 | Easterly | 108/44 |
| 4,453,788 | 6/1984 | Russell | 108/44 |
| 4,553,788 | 6/1984 | Russell | 312/231 |
| 4,749,161 | 6/1988 | Falcone | 108/44 |
| 4,805,867 | 2/1989 | McAllister | 248/441.1 |
| 4,890,559 | 1/1990 | Martin | 108/44 |
| 4,909,159 | 3/1990 | Gonsoulin | 108/44 |
| 4,915,035 | 4/1990 | Clark | 108/44 |
| 4,974,805 | 12/1990 | Douglas | 108/44 |
| 4,995,637 | 2/1991 | Muraishi | 108/44 |
| 5,060,581 | 10/1991 | Malinski | 108/44 |
| 5,177,665 | 1/1993 | Frank et al. | 108/44 |

FOREIGN PATENT DOCUMENTS 2144627 3/1985 United Kingdom ................. 108/44

Primary Examiner—Michael J. Milano

[57] ABSTRACT

The present invention relates to a combined support section and an article-support panel for use in conjunction with a vehicle steering wheel. The steering wheel mounted support is devised for detachability mounting thereto and pivotally affix the article-support panel. Additionally, the steering wheel support section also provides the article-support panel with an underside gusseted angle bracing arrangement having an infinitely angular adjustment arrangement. Moreover, located above the article-support panel and integrally provided on the top panel of the support section, receptacles are provided for bindingly engaging and removability receiving thereto of reading material such as a newspaper, book, a magazine or the like. The article-support panel defines a working surface to hold a meal, writing material, a lap top computer or other things that are used in a car.

8 Claims, 3 Drawing Sheets

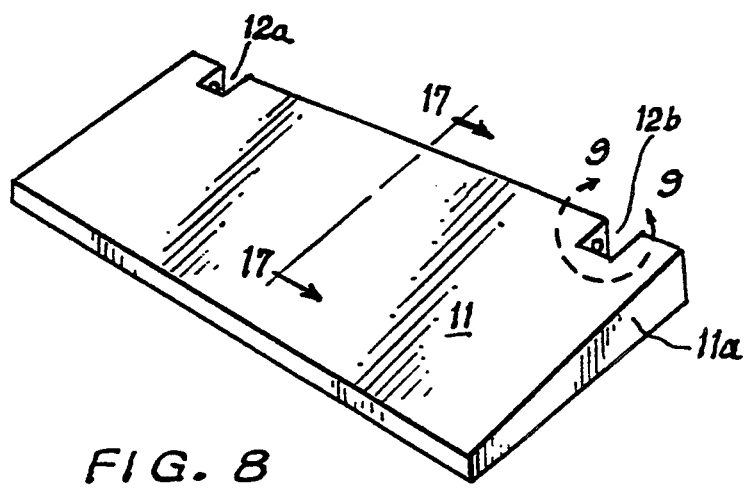
FIG. 8
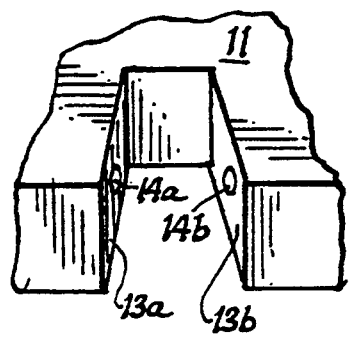
FIG. 9
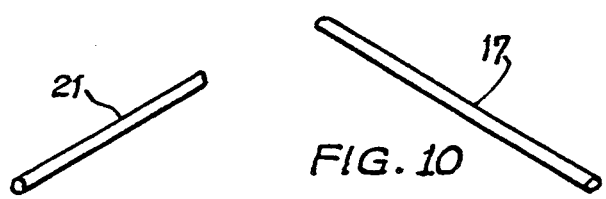
FIG. 14          FIG. 10
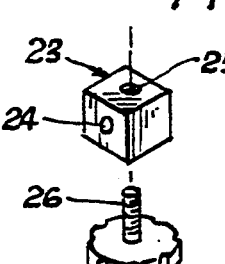
FIG. 15
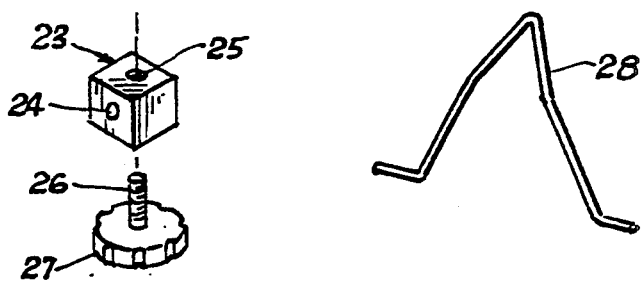
FIG. 13          FIG. 12
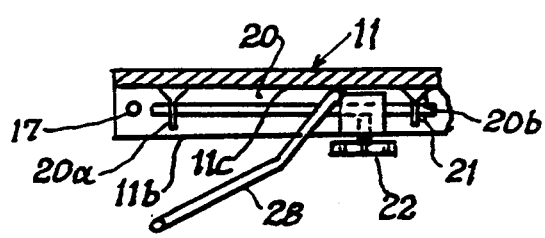
FIG. 11
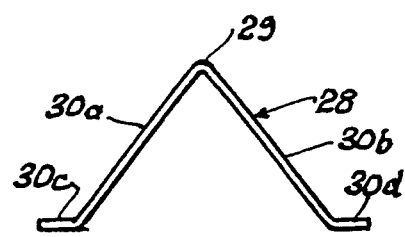
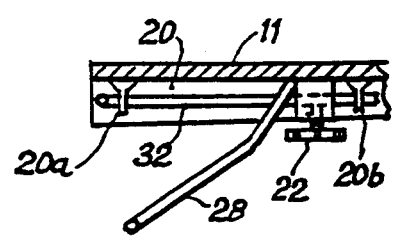
FIG. 17
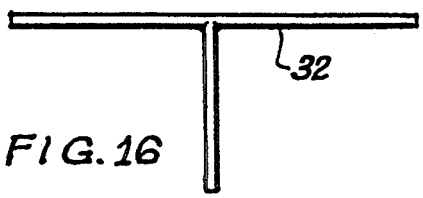
FIG. 16

COMBINED SUPPORT AND ARTICLE-SUPPORT PANEL FOR USE IN CONJUNCTION WITH A VEHICLE STEERING WHEEL

BACKGROUND

1. Field of Invention

The present invention relates primarily to detachability mounting of a combination of support means and article-support panel upon a vehicle steering wheel, supporting articles for a person seated behind the steering wheel in a practical suspended manner which aids in activities such as: writing, using a lap computer, eating, reading and the like.

BACKGROUND

2. Description of Prior Art

People regularly make use of their automobiles for activities other than commuting from place to place. People or vocational people, such as sales representatives, use the vehicle's privacy and comfort for business work such as writing, use of a lap computer, or leisure activities such as eating or reading the newspaper.

Prior inventors sought to present means by which people seated behind the steering wheel could perform activities, as evidenced by:

"Serving Tray"—U.S. Pat. No. 2,211,962 dated Aug. 20, 1940 to Morris, describing a steering wheel bail engagement means supporting a tray proper.

"Steering Wheel Tray"—U.S. Pat. No. 2,299,025 dated Oct. 13, 1942 to McGinley, describing outwardly divergent U-shaped receptacles means engaging the steering wheel and supporting a tray proper.

"Portable Desk"—U.S. Pat. No. 2,749,655 dated Jun. 12, 1956 to Ashton, describing a hinged writing surface provided with a frame for mounting the surface on a rim of a steering wheel.

"Portable Desk"—U.S. Pat. No. 3,074,745 dated Jan. 22, 1963 to Burckhalter, describing a plate provided with horizontally-oriented book support and a cooperating wire clip that serves both to support the book and removably engage the steering wheel.

"Table Structure For Use In Motor Vehicles"—U.S. Pat. No. 3,643,606 dated Feb. 22, 1972 to Vise, describing a two sections table. First table section is provided with an adaptable yoke means for steering wheel engagement. A second table section is hinged to the first table section, and a ratchet equipped hinge means accommodates angular adjustment between the two sections. The hinge means is provided with a spring-loaded ratchet arrangement. Thereby pushing against the opposing force of the spring, whereby separating the ratchet arrangement interlocking teeth, the two table sections can be tilted relative to each other.

"Collapsible Tray With Adaptable Hook Arrangement"—U.S. Pat. No. 3,817,190 dated Jun. 18, 1974 to Evangelista, describing a string arrangement retaining a tray at 90 degrees with respect to a back support. The back support has a hook arrangement used to suspend the collapsible tray to the vehicle's window.

"Portable Desk"—U.S. Pat. No. 4,453,788 dated Jun. 12, 1984 to Russell, describing a flat surface along with a plurality of hooks extending from the flat surface for engagement with the steering wheel. A writing surface is disposed above the flat surface and is inclined in the same direction as the steering wheel. The writing surface is hinged to provide access to an inner cavity which holds papers, writing instruments and the like. The portable writing desk may also be used in the lap of a person or on a flat surface and thus provides an inclined writing surface that is comfortable and convenient.

"Steering Wheel Platform"—U.S. Pat. No. 4,805,867 dated Feb. 21, 1989 to McAllister, describing a one piece platform with integrally provided elongated U-shaped slots, open in a common direction, for engaging the rim of the steering wheel.

"Automobile Comuter Desk"—U.S. Pat. No. 4,909,159 dated Mar. 20, 1990 to Gonsoulin, describing a desk used in conjunction with a seat adjacent to the driver seat, having support legs and a sliding tray capable of moving closer to the driver seat whereby a lap computer, sited on top of the sliding tray, is more accessible by the driver. "Automobile Food Service Tray"—U.S. Pat. No. 4,915,035 dated Apr. 20, 1990 to Clark, and McMillan, describing a platform, or tray, with elongated slots, open towards each other, for engaging the rim of the steering wheel.

"Steering Wheel Tray Apparatus"—U.S. Pat. No. 5,060,581 dated Oct. 29, 1991 to Malinski, describing a first panel having a strap means to create a yoke for steering wheel engagement. A second panel, comprising the tray, is hinged to the first panel and provides a protruding ledge to prop reading material in an upright position. Linking the panels is a pair of strap means, which restrains and limits pivotal movement of the second panel at predetermined horizontal position. Length of the panels linking-straps determine the tray horizontal adjustment. Such length is calibrated by bunching the retaining ends behind the panels, and transversely introduce a brad through regularly spaced slits provided in the straps to hold the straps ends bunched.

The requisites of people placing to use any of the prior invented devices have been partially solved, but these previously presented approaches had and still have significant problems:

Previously cited, McGinley (U.S. Pat. No. 2,299,025), McAllister (U.S. Pat. No. 4,805,867) and Clark (U.S. Pat. No. 4,915,035) inventions; while utilizing the tray devices, the cantilever type support arrangement is placing great stress upon the steering wheel engagement elements, rendering such engagement method prone to disengagement and potential spill of suspended articles.

Previously cited, Vise (U.S. Pat. No. 3,643,606) invention; the table's sections hinge mechanism is constructed with a spring-loaded ratchet arrangement. Consequently, according to the specific example illustrated in the drawings, angular adjustment is merely in measurable steps as defined by the resolution of the meshing teeth of the ratchet. Moreover, such mechanism would require a multitude of robust parts suitable to withstand forces applied by a user hands in addition to the objects suspended on the table portion.

Previously cited, Malinski (U.S. Pat. No. 5,060,581) invention; length of the panels linking-straps define the horizontal adjustment of the tray surface. Such length is calibrated by introducing a brad through regularly-spaced slits provided in the straps. Consequently, as one can appreciate, calibration involves considerable time and dexterity to align the slits. Furthermore, one will have to ensure that equal number of slits are retained on each strap, otherwise only one strap, one side, will be load supporting.

Previously cited, Evangelista (U.S. Pat. No. 3,817,190) and Gonsoulin (U.S. Pat. No. 4,909,159) inventions; Evangelista's window mounted tray and Gonsoulin's adjacent seat mounted lap computer desk, though not designed for mounting on the vehicle steering wheel, both require the user to assume an uncomfortable back-twisting posture while using the devices.

Accordingly, it is an object of this invention to provide an uncomplicated, robust, multi-functional and universally utilitarian, a combined structure for use in conjunction with a vehicle steering wheel.

Several objectives and advantages of my invention are:

The object of this invention is to integrally provide in the structure a one-piece attachment configuration for detachability mounting onto a vehicle steering wheel, thereby eliminate structural parts, ease utilization and increase reliability. The attachment configuration is defining a top segment of the steering wheel adapted to project through it, in addition is abutting the posterior side of the projecting top segment, thus providing a superior method of cantilevered support for the device.

Another object of this invention is to integrally provide in the structure receptacle means for bindingly engaging and removability receiving thereto of reading material, such as a newspaper, in a firmly retained upright position. Thus providing a clip-like retention method, being superior over bracing reading material against a protruding ledge.

Still another object of this invention is to provide the article-support panel with, quick-acting, infinitely angular adjustment arrangement; thereby brace the article-support panel in any utilitarian desired position, such as horizontal for eating or inclined for writing. This adjustment arrangement permits quick horizontal incline angle change for the article-support panel by manually unfasten a lever equipped torque screw, relocate a sliding stop, and manually re-fasten the torque screw.

Yet another object of this invention is to provide the article-support panel with an underside gusseted angle bracing arrangement; thereby greatly enhance the weight or pressure withstanding capabilities of the device whilst being used.

Further objects and advantages of my invention will become apparent from consideration of the drawings and ensuing description.

BRIEF DESCRIPTION OF THE DRAWINGS

FIG. 8 illustrates a perspective view of a preferred embodiment of the article-support panel, being presented detached from the support means section;

FIG. 9 presents a section of the embodiment of FIG. 8 taken along "9"—"9", illustrating the article-support panel aperture provided for interlacing with a unit of the first team of bearing means;

FIG. 10 illustrates a shaft means which pivotally couples the support means and the article-support panel;

FIG. 11 presents a section of the embodiment of FIG. 8 taken along "17"—"17", illustrating the article-support panel cross sectional view, detailing a guide aperture means;

FIG. 12 illustrates a top view of a V-shaped rod, used to provide gusseted angle bracing for the article-support panel;

FIG. 13 illustrates a perspective view of the embodiment of FIG. 12;

FIG. 14 illustrates a perspective view of a linear rod used in conjunction with FIG. 11, guide aperture means;

FIG. 15 illustrates a perspective view of a stop means used in conjunction with FIG. 11, guide aperture means;

FIG. 16 illustrates in top view an alternative embodiment of the shaft of FIG. 10 and the rod of FIG. 14 devised in a one piece construction;

FIG. 17 presents a section of the embodiment of FIG. 8 taken along "17"—"17", illustrating the article-support panel cross sectional view, detailing a guide aperture means utilizing the embodiment of FIG. 16.

DESCRIPTION OF THE PREFERRED EMBODIMENT

Figure 1:
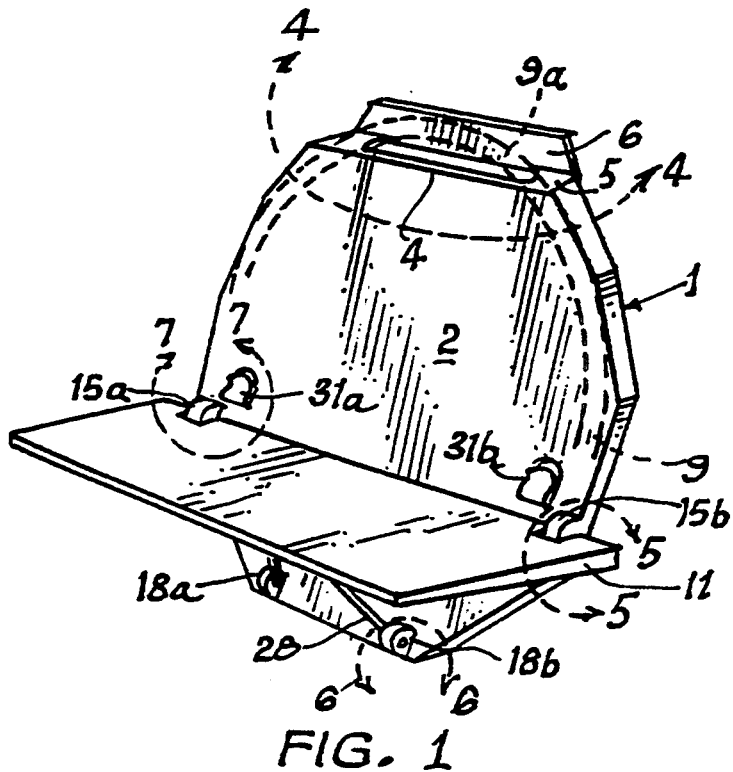
FIG. 1 illustrates a perspective view of a preferred embodiment of the invention as positioned on a steering wheel.
Figure 3:
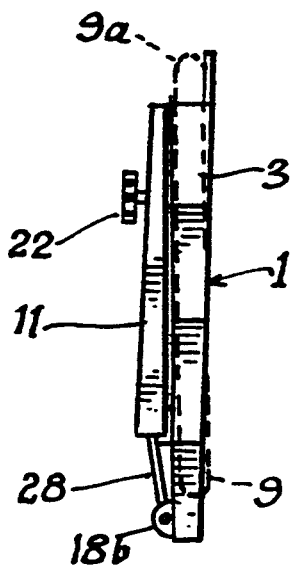
FIG. 3 illustrates the embodiment of FIG. 1, in side elevation view, with the article-support panel folded towards the support means.
Figure 2:
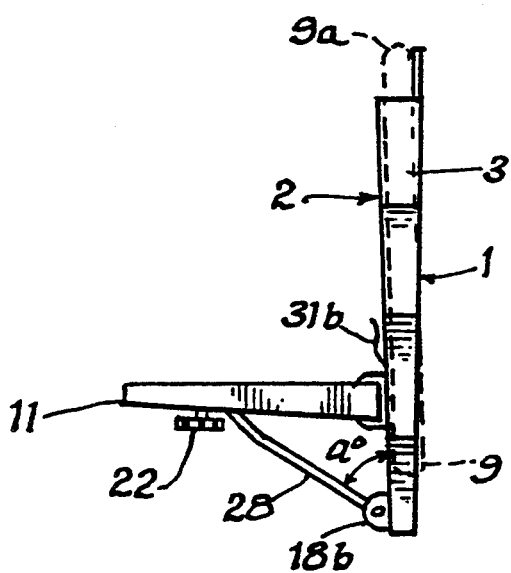
FIG. 2 illustrates the embodiment of FIG. 1 in side elevation view.

Referring to the drawings, the combined support and article-support panel is generally illustrated in FIG. 1. The device includes a support means, or back section, 1, designed to span over the rim of a conventional vehicle steering wheel 9, represented in invisible lines. Support means 1 has a top pane 12. Panel 2 rear surface abutting the steering wheel. As illustrated in FIGS. 1-4, top panel 2 peripheral margins have a plurality of downward flanges 3 which define a bottom opening for receiving steering wheel 9.

Figure 4:
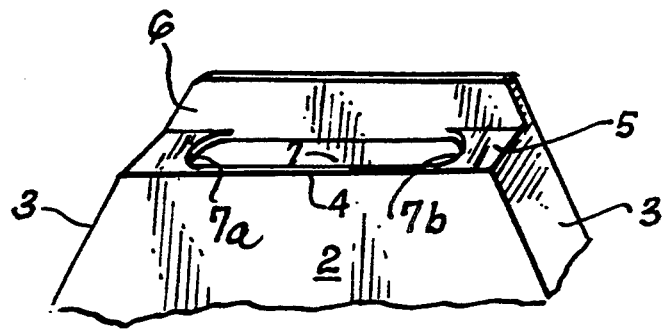
FIG. 4 presents the upper section of the embodiment of FIG. 1 taken along "4"—"4", illustrating a steering wheel detachability mounting means.

As illustrated to an enlarged scale in the partial section view "4"—"4" in FIG. 4, located on a top edge 4 of panel 2 is a first flange 5, downward extending at substantially a 90-degree angle from top panel 2. Flange 5 has a slot 7 which is in parallel relationship with top panel 2. Located on an end of first flange 5, the end which is in parallel relationship with top panel 2, is an upwardly extending, at substantially a 90-degree angle, a second flange 6. In combination, creating a L-shaped projection, flange 5 being the horizontal extension of the L and flange 6 being the vertical extension of the L. Slot 7 in flange 5 is terminated by a plurality of curved slot margins, a left side slot margin 7a and its counterpart 7b on the right side. The distance between slot 7 margins will define a sectional arched segment 9a, a top part of steering wheel 9, projecting trough slot 7. Flange 6 is abutting the posterior side of arched segment 9a providing cantilever support to support means 1. Accordingly, it will be appreciated that the support means 1 is securely, yet removably attached to the steering wheel 9 by means of, earlier described, first flange 5, slot 7 in conjunction with left slot margin 7a and right slot margin 7b, and second flange 6.

Figure 5:
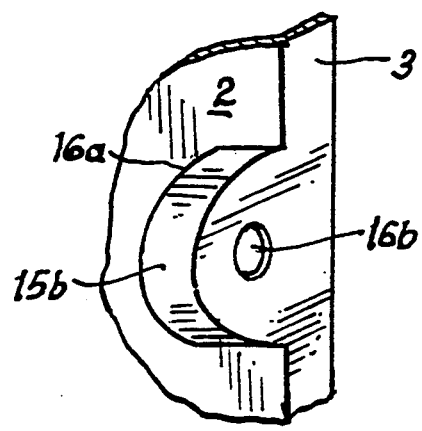
FIG. 5 presents a section of the embodiment of FIG. 1 taken along "5"—"5", a left side of the support means, illustrating a left unit of the first team of bearing means.

As further illustrated in FIG. 1 and to an enlarged scale in FIG. 5, taken along the line "5"—"5", support means 1 has integrally provided in its structure a plurality of protruding first team of bearing means, or first pivotal attachment means, 15. One bearing 15a on a left side and one bearing 15b on a right side, each upwardly extending from the surface of top panel 2. Each bearing 15 having a plurality of bore means 16. Bore 16a located on the outwardly extending surface on a left side of bearing 15, and a bore 16b, located on the opposite outwardly extending surface and longitudinally aligned with bore 16a. First team of bearing means 15, are designed to extend into cooperating apertures 12 on an article-support panel 11, illustrated in FIG. 8 and 9, the details of each are discused hereafter.

As is better illustrated in FIGS. 8, 9 and FIG. 11 the invented device includes an article-support panel 11, generally planar and relatively rectangular shaped, its perimeter having a plurality of flanges 11a. Article-support panel 11 has a bottom side 11b, bottom side 11b has an underside surface 11c.

Article-support panel 11 has a plurality of apertures, or interlacing means, 12. An aperture 12a on left rear side and an aperture 12b on the right rear side, extending part-way from the rear side toward the front side of article-support panel 11. Apertures 12a and 12b, each having downward extending inner flanges 13a on the left and 13b on the right, which surfaces is having a plurality of bore means 14a in 13a and 14b in 13b. All bores longitudinally aligned and oppositely disposed.

Illustrated in FIG. 10, a shaft, or first connecting means, 17, having predetermined dimensions, is extending through each bore means 14a and 14b of apertures 12a and 12b in article-support panel 11 and through bore means 16a and 16b of the first team of bearing means 15a and 15b, thereby pivotally couple article-support panel 11 onto support means 1. As is apparent from side elevation views depicted in FIGS. 2 and 3, article-support panel 11 is selectively foldable upon shaft 17 toward and apart from top panel 2 of support means 1.

Figure 6:
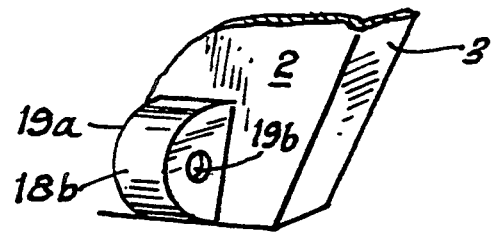
FIG. 6 presents a section of the embodiment of FIG. 1 taken along "6"—"6", a right, lower side of the support means, illustrating a right unit of the second team of bearing means.

As illustrated in FIG. 1 and to an enlarged scale in FIG. 6, taken along the line "6"—"6"; located substantially toward the lower section of support means 1, integrally provided in the structure, a plurality of protruding second team of bearing means, or second pivotal attachment means, 18. One bearing 18a on a left side and one bearing 18b on a right side, each upwardly extending from the surface of top panel 2. Each bearing 18 having a plurality of bore means, a bore 19a located on left side of bearing 18 outwardly extending surface, and a bore 19b located on the opposite outwardly extending surface of bearing 18. Bore 19b longitudinally aligned with bore 19a. Second team of bearing means 18 are designed to pivotally engage a V-shaped rod 28, part of a cooperating gusseted angle bracing arrangement for the article-support panel 11, the details of each are discused hereafter.

As illustrated in FIGS. 11–15, a linear rod 21 is attached to bottom side 11b of article-support panel 11, centrally extending from rear to front thereof, providing a guide aperture, or sliding means, 20 between bottom underside surface 11c to the linear rod 21. Linear rod 21 is affixed to underside surface 11c by attachment points 20a at rear, and 20b in front of underside surface 11c.

An adjustable stop means 22 comprising: a block of rigid material 23, possessing generally cubical shape, having a first bore 24 through it, and a second bore 25 perpendicularly disposed to intersect first bore 24. Linear rod 21 is inserted trough first bore 24, whereby block 23 is sliding upon linear rod 21. The second bore 25 is threaded to receive a quick-acting torque screw means 28, thereto. A lever 27 is attached to one end of quick-acting torque screw means 26. The lever 27 facilitates manual rotation of screw 26 to bring the screw's other end in physical contact with linear rod 21, thereby fasten upon the surface of linear rod 21.

A V-shaped rod, or second connecting means, 28, possessing predetermined proportions, is routed through guide aperture 20, its closed end 29 abutting linear rod 21 and its spaced-apart extending arms 30a and 30b point down. The ends 30c and 30d of the extending arms are outwardly bent, thus horizontally aligned. The horizontally aligned ends pivotally engage in the bore means of second team of bearing means 18a and 18b.

As those skilled in the art appreciate, at that time the article-support panel 11 is selectively foldable apart from top panel 2 of support means 1, the trekking of V-shaped rod closed end 29, guided by aperture means 20, moves toward adjustable stop means 22, bringing about physical contact with the stop means. With the V-shaped rod end propped against the stop 22 the article-support panel 11 is braced at a utilitarian preselected horizontal angle. Thereat, a gusseted support angle is formed between top panel 2 to V-shaped rod 28, depicted as a° in FIG. 2, the angle being repetitive as long as the location of stop means 22 remains the same.

As is further appreciated, the guide aperture means 20 length is infinitely variable between rear linear rod 21 affixing point to the sliding block 22, consequently the angle a° of the gusseted support is infinitely variable, thereby the article-support panel 11 is braced at any user preferred horizontal angle. This adjustment arrangement permits quick horizontal incline angle change for the article-support panel 11, by manual release of the lever equipped torque screw 26, relocate the sliding stop 22 along the stretch of linear rod 21 and manually fasten the torque screw 26 upon linear rod 21 to stop any sliding motion.

Figure 7:
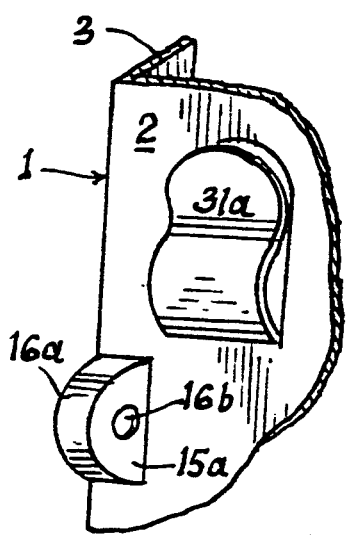
FIG. 7 presents a section of the embodiment of FIG. 1 taken along "7"—"7", a right, midst section, side of the support means illustrating a right receptacle unit.

As illustrated in FIG. 1, and to an enlarged scale in FIG. 7 taken along the line "7"—"7", integrally provided in the structure, located on top panel 2 of support means 1, aloft article-support panel 11 is a team of receptacle means, one receptacle 31a located on the left side, the other 31b located on the right side, longitudinally aligned and upwardly divergent each receptacle protruding from the surface of top panel 2.

As is appreciated, having a clip like feature, whereby bindingly engaging for removability receiving reading material, such as a newspaper, in an upright position.

As illustrated in FIGS. 16 and 17, depicting an alternate embodiment in which shaft 17 and linear rod 21 are combined to form a one piece T-shaped rod 32. As is appreciated, this T-shaped rod 32 essentially performs the same function as its separated counterparts, previously described, It will be appreciated by those skilled in the art that the sections of the invented device, support means 1 and article-support panel 11 can be constructed from various materials. In one specific example, according to the embodiment of FIG. 1, plywood was used as the creative medium.

A particularly desirable method of manufacture is injection molding of an appropriate plastic material. The term "internally provided in the structure" has been used to describe embedded features which are integrally provided in the structure by the contour of them old used to form the molded sections of the device.

While my above description contains many specificities, these should not be construed as limitations on the scope of the invention, but rather as an exemplification of one preferred embodiment thereof. Many other variations are possible. For example, on the surface of top panel 2 of support means 1, one can provide ancillary features such as a digital watch, a mirror, a thermometer, a combination of thereof, or the like. Additionally, the top surface of article-support panel 11 can have a coarse-like feel thereby providing anti-skid like feature. Moreover, the top surface of article-support panel 11 can have recesses for cup, plate, silverware and the like.

Accordingly, as set forth above, it is an object of this invention to provide an uncomplicated, robust, multifunctional and universally utilitarian, a combined structure for use in conjunction with a vehicle steering wheel, supporting articles for a person seated behind the steering wheel in a practical suspended manner and aiding in carrying-on such activities as: writing, using a lap computer, eating, reading and the like.

While the preferred embodiments of this invention have been described above, it will be recognized and understood that various modifications may be made therein and the appended claims are intended to cover all such modifications which may fall within the spirit and scope of the invention.

Having described my invention with the particularity set forth above, what is claimed is:

1. A combination of support means and an article-support panel for sustaining objects in a practical suspended manner upon a vehicle steering wheel, comprising:

a support means, said support means including:

a top panel, said top panel possessing approximately axially symmetrical shape about its perpendicular center line; said top panel having a plurality of peripheral margins, said margins having downward depending flanges therefrom to define a bottom opening; whereby said bottom opening spans over and receives a vehicle steering wheel;

a detachability mounting means integrally provided along an upper extremity of said top panel for detachability mounting of said support means upon said vehicle steering wheel; said detachability mounting means including:

a first flange means, rearward extending and perpendicularly disposed from an upper extremity of said top panel;

a second flange means, said second flange oriented substantially in parallel relationship with said top panel, upwardly extending and perpendicularly disposed from an end of said first flange means;

a slot provided in said first flange means for receiving a top segment of said steering wheel, said slot terminated by a pair of oppositely-disposed curved slot margins;

whereby said slot in said first flange means is adapted to engage said steering wheel at said slot margins, and said slot margins define a length of a top segment of said steering wheel adapted to project through said slot;

whereby said second flange means is abutting a posterior side of said top segment of said steering wheel, for stabilizing said support means upon the steering wheel;

a first team of bearing means, downwards of said detachability mounting means, integrally provided on said top panel of said support means; each said first bearing means upwardly extending from the surface at opposing sides of said top panel; each said first bearing means having a plurality of bore means, longitudinally aligned and oppositely disposed on said first bearing means upwardly extending surfaces;

a second team of bearing means, downwards of said first team of bearing means, integrally provided on said top panel of said support means; each said second bearing means upwardly extending from the surface at opposing sides of said top panel; each said second bearing means having a plurality of bore means, longitudinally aligned and oppositely disposed on said second bearing means upwardly extending surfaces;

an article-support panel, generally planar having a front and rear side, a left and right side and side flanges depending thereof; said article support panel having a top and a bottom side, said bottom side having an underside surface, said article-support panel includes:

a plurality of apertures extending part-way from said rear side toward said front side of article-support panel; said apertures having downward extending inner flanges; said downward inner flanges surfaces having a plurality of bore means, said bore means longitudinally aligned and oppositely disposed;

a guide aperture means, said guide aperture means including:

a linear rod affixed to said bottom side of said article-support panel, centrally extending from rear to front thereof, providing an aperture between said bottom underside surface to said linear rod; said linear rod having a rear affixing point and a front affixing point;

an adjustable stop means comprising: a block of rigid material having a first bore through it and a second bore perpendicularly disposed thereto, said second bore being threaded to receive a quick-acting torque screw means thereto; said quick-acting torque screw means having a lever means to facilitate manual rotation;

whereby said linear rod extends trough said first bore and said block is sliding upon said linear rod; thereby rotating said lever of said quick-acting torque screw in a tightening direction, said quick-acting torque screw fasten upon said linear rod to stop any sliding motion thereof; whereby said guide aperture means extent is infinitely variable between said linear rod rear affixing point to said adjustable stop means;

whereby said first team of bearing means extend into said apertures of said article-support panel and said apertures at said rear side of said article-support panel is adapted to interlace with said first team of bearing means;

a shaft means of predetermined diameter is extending through each said bore means of said apertures and through each said bore means of said first team of bearing means; thereby pivotally couple said article-support panel onto said support means;

whereby said article-support panel is selectively foldable upon said shaft means toward and apart from said top panel of said support means;

a V-shaped rod of predetermined proportions is routed through said guide aperture means, said V-shaped rod having a closed end and a plurality of spaced-apart extending arms, a plurality of ends of said spaced-apart extending arms being bent and horizontally aligned, said closed end abutting said linear rod and said spaced-apart extending arms point down and the extending arms ends pivotally engage in said bores of said second team of bearing means;

whereby the length of said guide aperture means restricts the travel range of said closed end of said V-shaped rod from said rear affixing point of said linear rod to said block of said adjustable stop means;

thereat said article-support panel is selectively foldable apart from said top panel of said support means, said closed end of said V-shaped rod moves in said guide aperture means toward said adjustable stop means to bring about physical contact thereto; thereby prods said article-support panel in a presettable position.

2. The invention as defined in claim 1, wherein said top panel of said support means further including:
a team of receptacle means integrally provided on said top panel of said support means, betwixt said detachability mounting means and said article-support panel, each said receptacle upwardly divergent and axially aligned on opposite sides of said top panel; whereby bindingly engaging for removability receiving reading material in an upright position on a top surface of said top panel.

3. A combination of support means and an article-support panel; whereby said combination detachably mounts upon a vehicle steering wheel and said article-support panel is braced with an underside gusseted support angle arrangement means, comprising:
a support means, said support means having a top panel; said top panel spans over said vehicle steering wheel; a rear surface of said top panel abutting said steering wheel;
a L-shaped rearward projection located on a top section of said top panel, including a slot in a horizontal extension of said L-shape projection to receive a top arching segment of said steering wheel, a vertical extension of said L-shaped projection is abutting the posterior side of said top arching segment of said steering wheel; thereby, in alliance, said support means is firmly held suspended by said top arching segment of said steering wheel and detachably mounts thereto;
an article-support panel, generally rectangularly shaped; having a top and a bottom side, said bottom side having an underside surface; and having a plurality of apertures, said apertures located on a rear side of said article-support panel;
said support means having a plurality of protruding first bearing means, located below said L-shaped projection, upwardly extending from said top panel and interlacing with said apertures of said article-support panel;
pivotal attachment means having a shaft extending trough a plurality of bores in said apertures and in a plurality of bores in said protruding first bearing means, pivotally attaching said article-support panel to said support means; thereby said support means detachably mounts upon said vehicle steering wheel, in addition pivotally affix said article-support panel in a gusseted support angle means;
said gusseted support angle means including:
a bracing means having a V-shaped rod, said V-shaped rod having a closed end and a plurality of spaced-apart extending arms, a plurality of ends of said spaced-apart extending arms being bent in horizontal alignment, the extending-arms ends of said V-shape rod pivotally engage in a plurality of bores located in a second bearing means, said second bearing means located on said top panel, bellow said first bearing means;
a guide-aperture means created between said underside surface of said article-support panel to a linear rod attached thereto, said linear rod centrally extending from a rear to a front of said article-support panel;
an adjustable stop means is slideable mounted onto said linear rod; said adjustable stop means having a lever equipped screw for manual fastening said adjustable stop means along the stretch of said linear rod in any desired location;
said closed end of said V-shaped rod is routed through said guide-aperture means; thereat said article-support panel is folded apart from said support means, said closed end of said V-shaped rod is guided by said aperture versus said adjustable stop means;
thereafter said closed end of said V-shaped rod is propped against said adjustable stop means said article-support panel is braced in a gusseted support angle; said angle having said V-shaped rod on one side and said top panel on other side.

4. The invention as defined in claim 3, wherein said top panel of said support means further including:
at least one receptacle means integrally provided on said top panel of said support means, betwixt said L-shaped projection and said first bearing means; said receptacle bindingly engaging for removability receiving reading material in an upright position on a top surface of said top panel.

5. The invention as defined in claim 4, wherein said top panel of said support means further including:
a team of receptacle means integrally provided on said top panel of said support means, betwixt said L-shaped projection and first bearing means, each said receptacle upwardly divergent and axially aligned on opposite sides of said top panel; whereby bindingly engaging for removability receiving reading material in an upright position on top surface of said top panel.

6. A combination of support means and an article-support panel for detachability mounting upon a vehicle steering wheel, presenting objects in a practical suspended manner for a person seated behind said steering wheel, comprising:
a support means, said support means having: a top panel; said top panel spans over a vehicle steering wheel, and a rear surface of said top panel abutting said steering wheel; an upper section of said support means devised for detachability mounting upon said steering wheel; a first pivotal attachment means, downwards of said detachability mounting means; a second pivotal attachment means, downwards of said first pivotal attachment means;

an article-support means, supporting articles for a person seated behind the steering wheel comprising a panel, generally rectangularly shaped, having a top and a bottom side; and having interlacing means located on a rear side;

a first connecting means, pivotally attach said first pivotal attachment means to said interlacing means; thereby pivotally affix said article-support panel onto said support means; a second connecting means braces the article-support section in a gusseted support angle means arrangement;

said gusseted support angle means including:

a bracing means including: a first end of said second connecting means, pivotally affixed to said second pivotal attachment means, and a second end of said second connecting means connected by a sliding means to said bottom side of said article-support panel such that said second end of said second connecting means is constrained to a substantially guided movement by said sliding means, along said bottom side of said article support panel and will not flop about loosely;

thereat said article-support panel is selectively foldable apart from said top panel of said support means, said second end of said second connecting means moves along said sliding means, at said bottom of said article-support means, toward an adjustable stop means to bring about physical contact thereto; said adjustable stop means being adjustable without removal from said combination, whereby said article-support means can be re-set, folded and deployed for use, requiring no disassembly; furthermore props said article-support panel in a pre-settable position without requiring adjustment or re-orientation established with each use;

thereafter said second end of said second connecting means is propped against said adjustable stop means said article-support panel is braced in a gusseted support angle; said angle having said second connecting means on one side and said top panel of said support means on other side.

7. The invention as defined in claim 6, wherein said detachability mounting means of said support means further including:

a L-shaped rearward projection located on a top section of said top panel including a slot in a horizontal extension of said L-shape projection to receive a top etching segment of said steering wheel; a vertical extension of said L-shaped projection is abutting the posterior side of said top arching segment of said steering wheel; thereby said support means is firmly held suspended by said L-shaped projection and said top arching segment of the steering wheel and detachably mounts thereto.

8. The invention as defined in claim 6 wherein said top panel of said support means further including:

at least one receptacle means integrally provided on said top panel of said support means, betwixt said detachability mounting means and said first pivotal attachment means, said receptacle upwardly divergent and oriented in parallel relationship with said article-support panel; whereby bindingly engaging for removability receiving reading material in an upright position on top surface of said top panel.

* * * * *